(12) United States Patent
Liu et al.

(10) Patent No.: US 6,957,357 B2
(45) Date of Patent: Oct. 18, 2005

(54) CLOCK SYNCHRONIZATION WITH REMOVAL OF CLOCK SKEWS THROUGH NETWORK MEASUREMENTS IN DERIVATION OF A CONVEXT HULL

(75) Inventors: Zhen Liu, Tarrytown, NY (US); Cathy Honghui Xia, White Plains, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 09/920,138

(22) Filed: Jul. 31, 2001

(65) Prior Publication Data

US 2002/0120416 A1 Aug. 29, 2002

Related U.S. Application Data

(60) Provisional application No. 60/244,228, filed on Oct. 30, 2000.

(51) Int. Cl.[7] .................................................. G06F 1/04
(52) U.S. Cl. ........................................ 713/503; 713/400
(58) Field of Search .................................. 713/503, 400

(56) References Cited

U.S. PATENT DOCUMENTS 5,959,568 A * 9/1999 Woolley ........................ 342/42
6,327,274 B1 * 12/2001 Ravikanth ................... 370/516
6,539,490 B1 * 3/2003 Forbes et al. ............... 713/401
6,661,810 B1 * 12/2003 Skelly et al. ................ 370/516

* cited by examiner

Primary Examiner—Lynne H. Browne
Assistant Examiner—Tse Chen
(74) Attorney, Agent, or Firm—Duke W. Yee; Rafael Perez-Pineiro; Gerald H. Glanzman

(57) ABSTRACT

A method, computer program product, and data processing system for estimating and correcting the amount of clock skew in end-to-end network timing measurements is disclosed. Measured delays are combined with their time of measurement to create ordered pairs. These ordered pairs represent points within a Cartesian plane. The convex hull of these points is determined, and an optimal line segment from the resulting polygon is selected and extrapolated to create an affine function estimating clock skew over time. The optimal line segment of the polygon is one that optimizes a selected objective function. The objective function is selected so as to be an appropriate measurement of the accuracy of the resulting linear function as an estimate of the actual clock skew.

15 Claims, 5 Drawing Sheets

FIG. 6
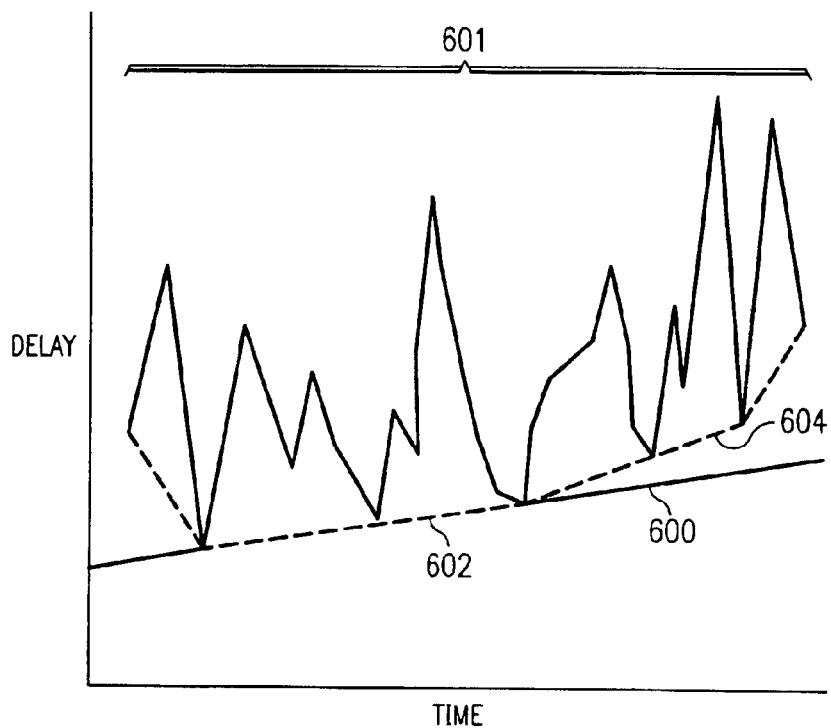
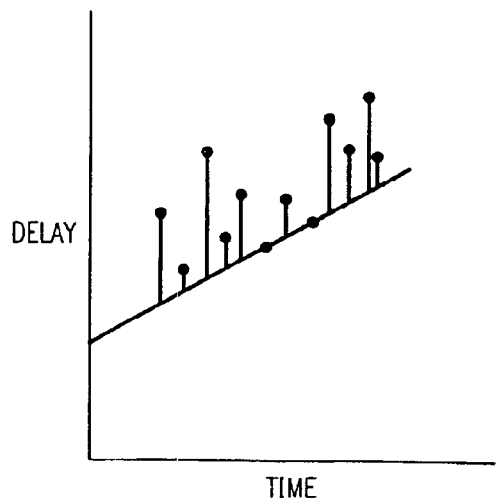
FIG. 7A
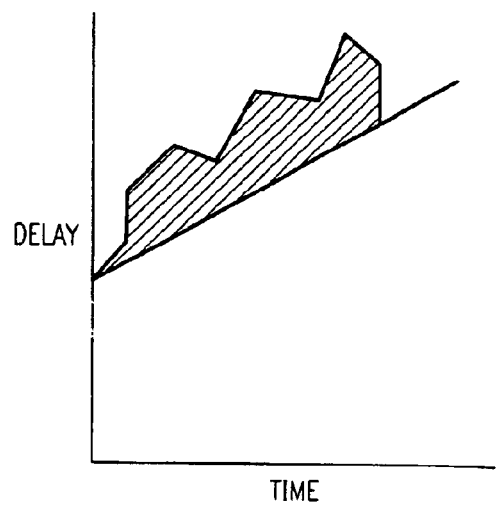
FIG. 7B

CLOCK SYNCHRONIZATION WITH REMOVAL OF CLOCK SKEWS THROUGH NETWORK MEASUREMENTS IN DERIVATION OF A CONVEXT HULL

The present application claims priority from U.S. Provisional Patent Application No. 60/244,228, filed Oct. 30, 2000.

BACKGROUND OF THE INVENTION

1. Technical Field

The present invention relates to enhancing the accuracy of network delay measurements. More specifically, the present invention provides a method, computer program product, and data processing system for correcting errors in end-to-end network delay measurements caused by clock skew between the two communicating data processing systems.

2. Description of Related Art

The accurate measurement of end-to-end delay between two data processing systems communicating through a network is very important to determining the state of the network. Having accurate measurements of the delay associated with a particular data path within the network aids network engineers as well as network applications in making decisions regarding network routing, network fault detection, and other issues involved in maintaining or using a network.

End-to-end network delay measurements are generally made by having a first data processing system timestamp and send a packet of data to a second data processing system. The second data processing system reads the current time and compares the current time to the timestamp to determine the end-to-end delay (i.e., how long it took the packet to make it across the network). If the two data processing systems' clocks are not perfectly synchronized, however, this measured delay will not be entirely accurate. Moreover, if one clock operates at a faster or slower speed than the other one, the difference between the measured delay and the actual delay will vary over time. This phenomenon is known as clock skew.

It is thus desirable to reduce, if not eliminate, the effect of clock skew on network measurements. A number of authors have proposed methods of reducing the effect of clock skew by making estimates of the clock skew based on empirical measurements, then compensating the measured delay values to correct for the clock skew. From empirical measurements, one can see that the effect of clock skew is an increase or decrease in measured clock delay that changes according to a linear pattern.

Moon, Skelly, and Towsley, in *Estimation and Removal of Clock Skew from Network Delay Measurements*, Proceedings of the IEEE INFOCOM Conference on Computer Communications, pp. 227–234, March 1999, used a linear-regression approach to develop a linear function to estimate the clock skew. Paxson, in *On Calibrating Measurements of Packet Transit Times*, Proceedings of the ACM SIGMETRICS, Madison, Wis., June 1998, used a median line-fitting technique to achieve the same goal.

These methods, however, ignore the fundamental notion that delay measurements are bounded by a linear clock skew function. They also degrade in accuracy when network measurements vary considerably or do not follow a normal distribution. As networks are seldom that well behaved, a need exists for a more accurate method of estimating clock skew, so that appropriate correction can be made to the measurements.

SUMMARY OF THE INVENTION

The present invention provides a method, computer program product, and data processing system for estimating the amount of clock skew in end-to-end network timing measurements. Measured delays are combined with their time of measurement to create ordered pairs. These ordered pairs represent points within a Cartesian plane. The convex hull of these points is determined, and an optimal line segment from the resulting polygon is selected and extrapolated to create an affine function estimating clock skew over time. The optimal line segment of the polygon is one that optimizes a selected heuristic, or objective function. The objective function is selected so as to be an appropriate measurement of the accuracy of the resulting linear function as an estimate of the actual clock skew.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a plot demonstrating the operation of a preferred embodiment of the present invention on a set of measured data points;

FIGS. 7A–7C are plots graphically demonstrating three objective functions that may be used within a preferred embodiment of the present invention;

DETAILED DESCRIPTION OF THE PREFERRED EMBODIMENT

Figure 1:
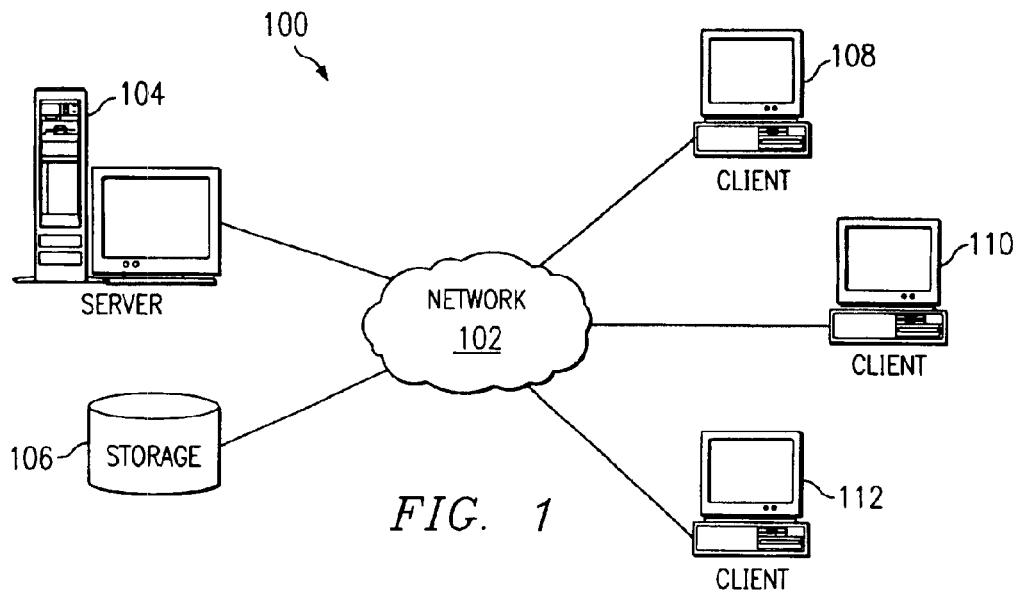
FIG. 1 is a diagram of a network in which the processes of the present invention may be performed.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
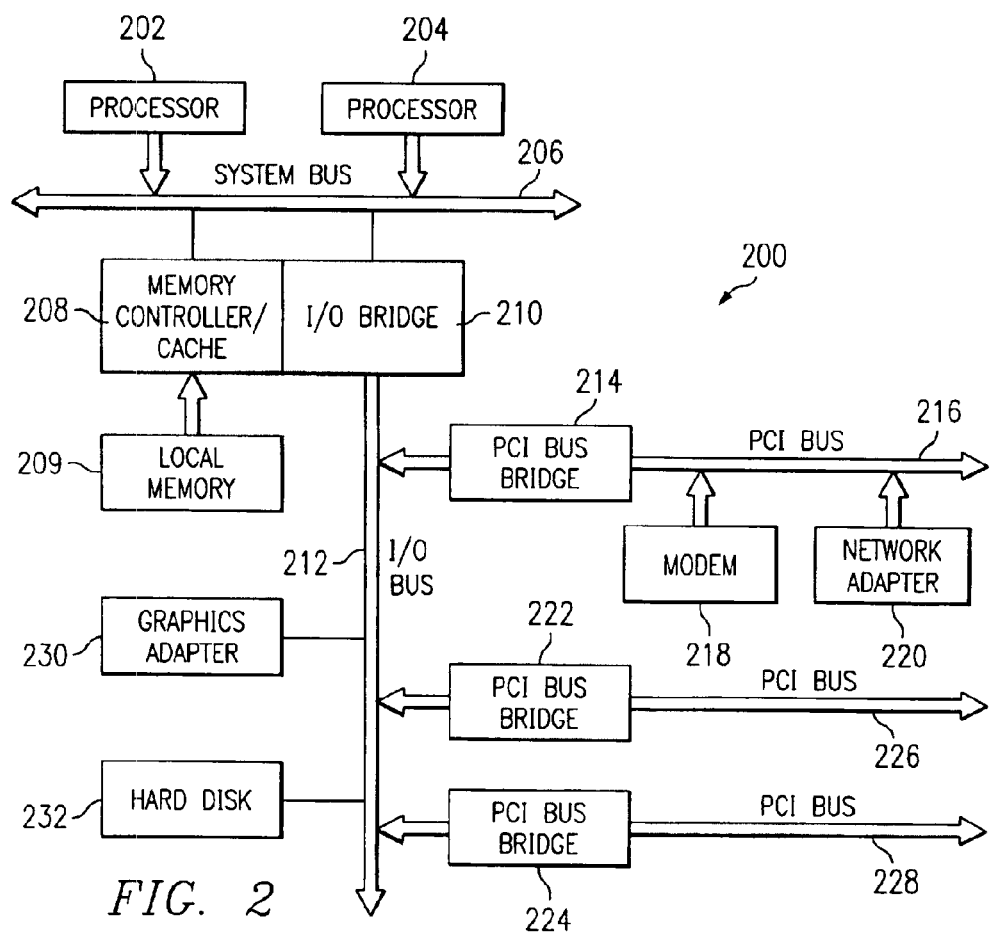
FIG. 2 is a block diagram of a server in which the processes of the present invention may be performed.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
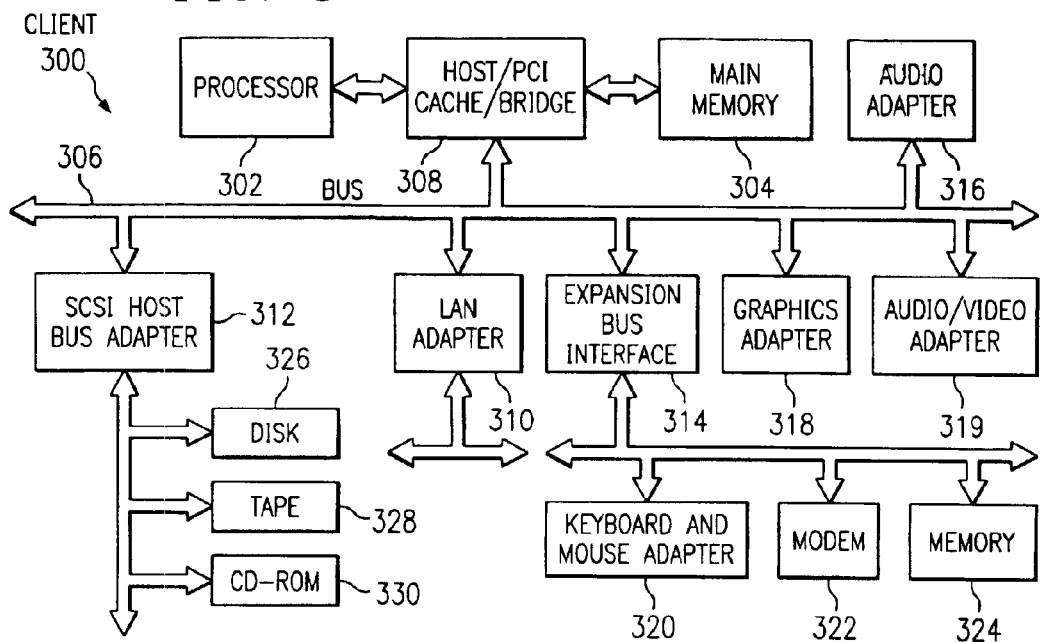
FIG. 3 is a block diagram of a client in which the processes of the present invention may be performed.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
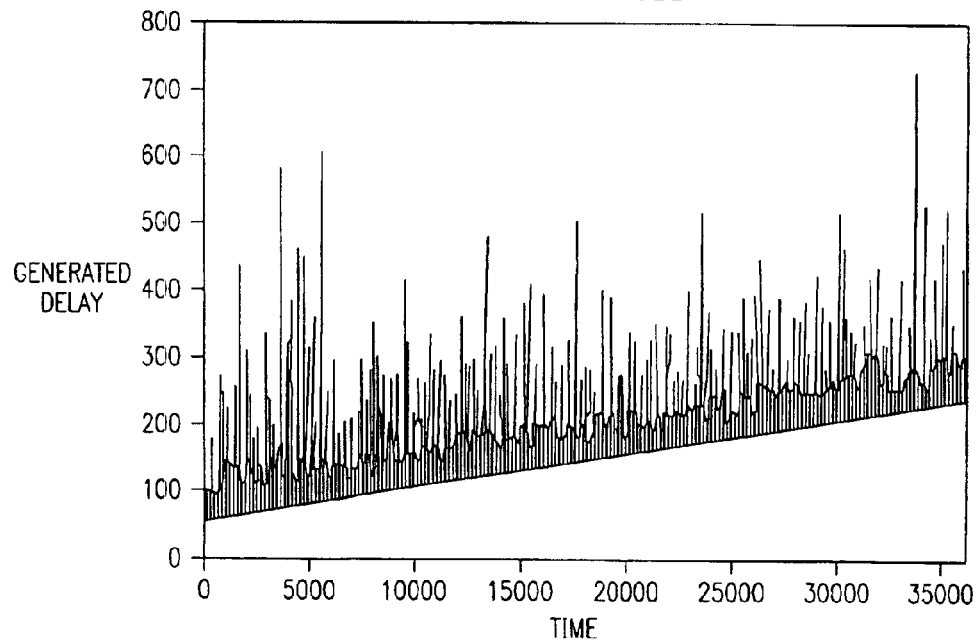
FIGS. 4A and 4B are plots of measured end-to-end delays over time in a preferred embodiment of the present invention.

The present invention provides a method, computer program product, and data processing system for estimating the clock skew in end-to-end network measurements based on empirical measurements of actual delay. FIG. 4A is a plot of end-to-end delay measurements over time between two networked data processing systems, client 108 and client 110 from FIG. 1, for instance. Notice that while the delay measurements vary considerably over time, they are bounded by what appears to be an affine function (that is, a function of the form $f(x)=mx+b$).

This makes sense if one considers the fact that each of the networked data processing systems has its own clock that operates at its own constant rate, which may be slightly faster or slower than the other. Thus, as one clock progresses at a higher rate than the other, the lower bound of the measured delays (which is the difference in timestamps produced by each of the two networked data processing systems), will increase or decrease as the two clocks' measured time values converge or diverge. Thus, in theory the measured delays are indeed bounded by an affine function, which represents the clock skew between the two networked data processing systems. Once the clock skew is known, end-to-end network measurements can be corrected (by subtracting out the clock skew) so as to achieve accurate measurements without physically synchronizing the two clocks.

Figure 4B:
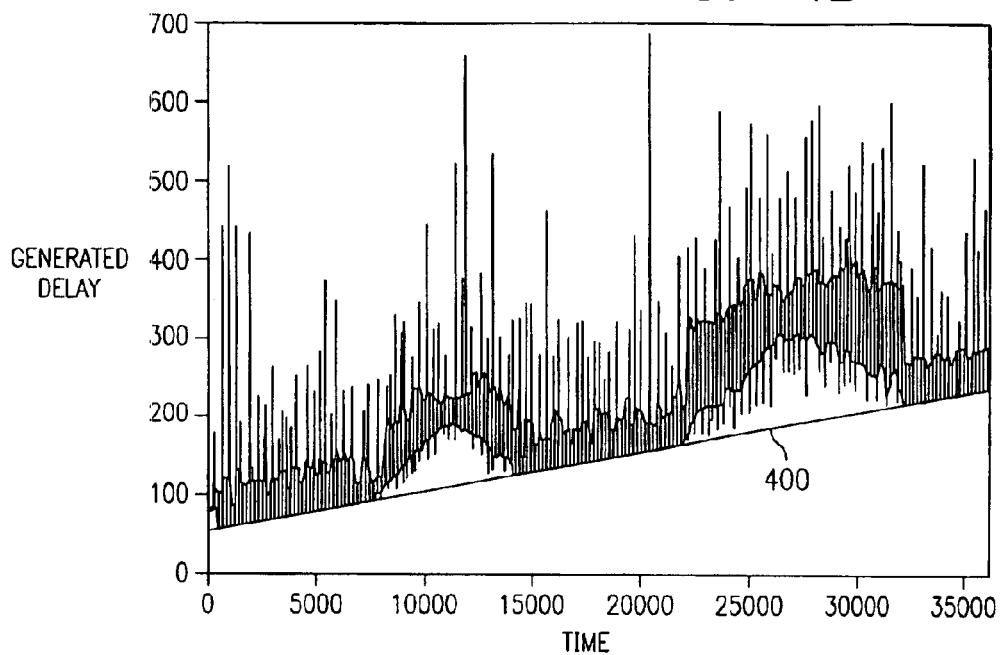

In practice, however, the task of accurately estimating this affine function is non-trivial, particularly when clock skews are slight. The actual measurements, as can be seen in FIG. 4A, fluctuate considerably, and as FIG. 4B shows, the fluctuations may be quite significant. FIG. 4B is a plot of measured delay over time, as is FIG. 4A. However, in FIG. 4B, there are two prominent "humps" in the measurements. In other words, during the "hump" time periods, the measured delays were considerably greater than in surrounding measurements. This may be due to some condition, such as net congestion, that results in a temporary increase in delay.

FIG. 4B also contains a plot of the convex hull (400) of the measurement data points. Before the convex hull is defined mathematically, below, it should be noted that convex hull 400 in FIG. 4B appears to be very close to the affine clock skew function. In fact, as will be seen in FIG. 5, convex hull 400 is not an affine function at all, but a polygon (or at least a portion of one).

Figure 5:
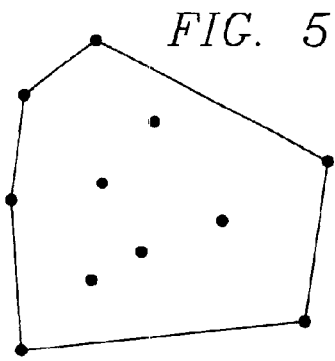
FIG. 5 is a diagram of the convex hull of a set of points in a cartesian plane in accordance with a preferred embodiment of the present invention.

FIG. 5 is a diagram illustrating the concept of a convex hull. The convex hull of a set of points (at least as the term is used in this document) is the smallest convex polygon such that each of the set of points is either on the boundary or in the interior of the polygon. Intuitively, if each of the points is represented by a nail sticking out of a board, the convex hull is the polygon obtained by extending a rubber band around the set of points.

There are many well-known algorithms for finding the convex hull of a set of points. By taking advantage of the fact that the points are sorted from left to right, in increasing order of their x-coordinate, we construct the following algorithm to find the lower convex hull of a set of points. The algorithm is written in terms of a set Q of points. The algorithm finishes in time which is linear in the number of points in Q.

```
Convex_Hull_L(Q)
    Let p₀ be the point in Q with the minimum x-coordinate, or the highest
        such point in case of a tie
    Let <p₁, . . . , p_m> be the remaining points in Q, sorted by x-coordinate
        from p₀ (if more that one point has the same x-coordinate, remove
        all but the one that is the lowest.)
    Create an empty stack S
    Push(p₀, S)
    Push(p₁, S)
    for i:= 2 to m do
        while p_i is below the line formed by the points Next-To-Top(S),
            Top(S), do
                Pop(S)
        Push(p_i, S)
    return S
```

FIG. 6 is a graph depicting the basic operation of a preferred embodiment of the present invention. An affine function 600 is a close approximation of a lower bound on data points 601, which are measured delays between two network-connected data processing systems. Affine function 600 is determined by extrapolating a selected line segment 602 along the edge of the convex hull (604) of data points 601. The particular line segment 602 is selected so that the resulting affine function optimizes some sort of "objective function." An objective function provides a measure of the closeness of affine function 600 to data points 601, so a tight lower bound for data points 601 can be found.

Figure 7C:
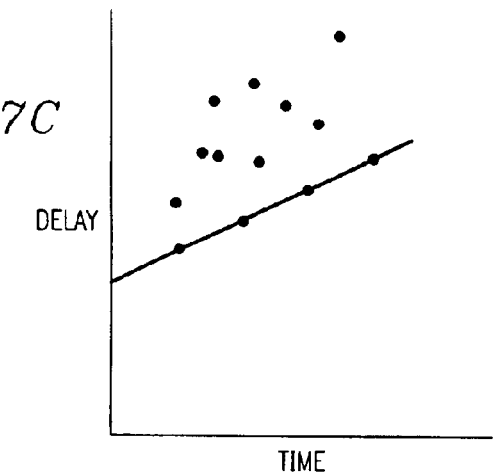

FIGS. 7A–7C are graphical representations of three such objective functions that may be used. One possible objective functions, depicted in FIG. 7A, is the sum of the vertical distances between the data points and the affine function line. An optimal affine function will minimize this objective function. Another similar objective function is the area between the "curve" formed by the data points and the affine function (via the trapezoidal rule), shown in FIG. 7B. An optimal affine function will minimize this objective function. FIG. 7C depicts a third objective function, the number of points on the affine function line. An optimal affine function will maximize this objective function.

An optimal solution using any of these objective functions may be obtained by extrapolating an affine function $g_j(t)=\alpha_j t+\beta_j$ for each line segment j of the convex hull edge, calculating the objective function for each of these functions using the measured data points, and selecting the $g(t)=\alpha t+\beta$ that optimizes the objective function.

While this procedure can be used with any of the three objective functions described here, a more efficient calculation can be made in the case of the first two objective functions (FIG. 7A and FIG. 7B), by exploiting some of the mathematical properties of these functions. Some definitions, however, are needed in order to continue this discussion. Let us define the set of measured data points as $\Omega=\{(t_i, d_i)|i=1, \ldots, N\}$, where each $(t_i, d_i)$ is a measurement of $d_i$ delay made at time $t_i$. Let us also define the affine function line as a locus of points L={(x, y)|y=αx+β}. We make the restriction that all of the points in Ω are above the line by requiring $$\forall (t_i, d_i) \in \Omega, \alpha t_i + \beta \leq d_i.$$

Next, we will write the first two objective functions in algebraic form. The first objective function can be expressed $$obj_1 = \sum_{i=1}^{N} (d_i - \alpha t_i - \beta),$$

or alternatively, $$obj_1 = \sum_{i=1}^{N} d_i - \sum_{i=1}^{N} t_i \alpha - N\beta.$$

Similarly, for the second objective function, $$obj_2 = \sum_{i=1}^{N-1} \frac{(d_i - \alpha t_i - \beta + d_{i+1} - \alpha t_{i+1} - \beta)(t_{i+1} - t_i)}{2}$$

$$= \sum_{i=1}^{N-1} \frac{(d_i + d_{i+1})(t_{i+1} - t_i)}{2} - \frac{t_N^2 - t_1^2}{2}\alpha - (t_N - t_1)\beta.$$

Thus, the first and second objective function may both be expressed in the form $$f(\alpha, \beta) = c_1 - c_2\alpha - c_3\beta,$$

where the three "c's" are constants that are derived from the measured data points according to the particular objective function being used. Since we are attempting to minimize this function, let us first minimize with respect to β to yield $$f(\alpha) = \min_\beta c_1 - c_2\alpha - c_3\beta,$$

$$s.t.\ t_i\alpha + \beta \leq d_i,\ i=1, \ldots, N.$$

Note that this result is graphically equivalent to moving the function line vertically until it touches the convex hull. Intuitively, any line that sufficiently minimizes the objective function will touch the convex hull at some point.

This function is convex in α, since it can be written in the form $$f(\alpha) = c_1 - c_2\alpha - c_3 \min_i \{d_i - t_i\alpha\}$$

$$= c_1 - c_2\alpha + c_3 \max_i \{t_i\alpha - d_i\},$$

so as to incorporate the constraints (which is convex, because "max" is a convex function). A convex function is a function with an increasing slope, according to the standard definitions in, for example, Papadimitriou and Steiglitz, *Combinatorial Optimization, Algorithms and Complexity*, Dover (1998), Definition 1.8 and Theorem 1.2. Note that this is possible because $c_3 > 0$. Since the function is convex, any local minimum of the function will also be a global minimum. Therefore, it remains to find a local minimum of $f(\alpha)$, since this will yield the lowest value $f(\alpha)$, the objective function, can assume. From differential calculus, we know that a local minimum of a function can be found by setting the function's derivative to zero. Thus, for some point $(t_k, d_k)$ through which an optimal function line crosses (i.e., that satisfies the "max" condition), $$\frac{df}{d\alpha} = c_3 t_k - c_2 = 0 \Rightarrow t_k = \frac{c_2}{c_3}.$$

It follows that f(alpha1)−f(alpha2)=(c3tk−c2)(alpha1−alpha2). This shows that when tk is smaller than c2/c3, f(alpha) is increasing. While when tk is larger than c2/c3, f(alpha) is increasing. Thus f(alpha) takes the minimum value when tk=c2/c3, which means the optimal line segment touches the convex hull of Ω through the point tk=c2/c3. Therefore the optimal solution is achieved by extrapolating the line segment along the boundary of the convex hull of Ω that crosses the line $$x = \frac{c_2}{c_3}.$$

For the first objective function, this vertical line can be expressed (by substituting in the appropriate values from the original formula) as $x = \Sigma_i t_i / N$, and for the second objective function $x = (t_1 + t_N)/2$.

Figure 8:
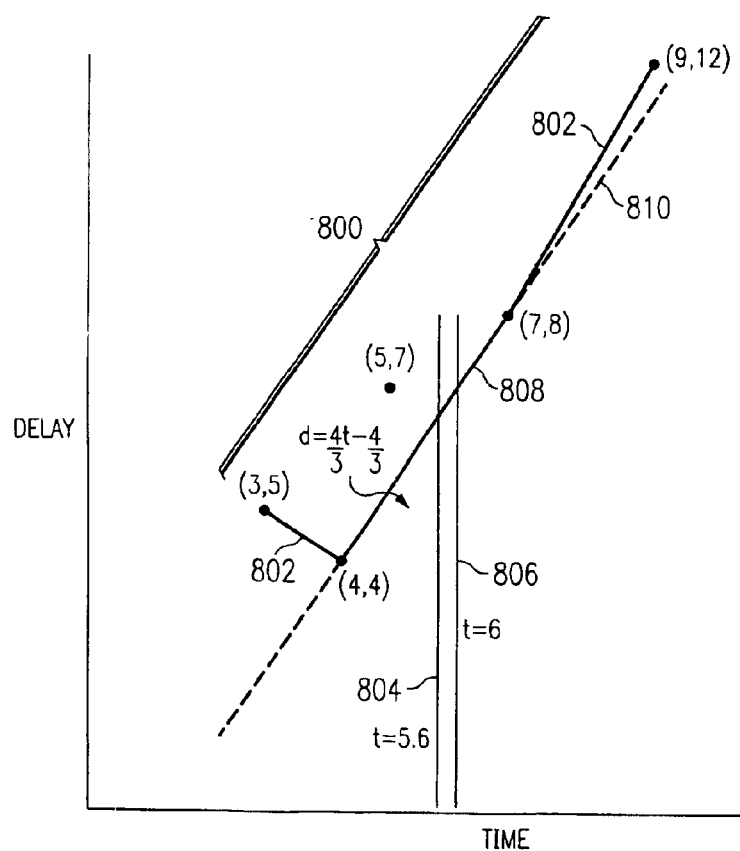
FIG. 8 is a plot showing the operation of a preferred embodiment of the present invention using the first and second objective functions from FIGS. 7A and 7B.

Put another way, to find the optimal result using the first objective function, one first finds the arithmetic mean of the measurement times, then finds a line segment on the lower edge of the convex hull of the measured data points containing a point having an x-coordinate of that arithmetic mean (there may be more than one if the x-coordinate is that of a vertex); that line segment is then extrapolated to achieve the desired optimal affine function. The process is identical for the second objective function, except the arithmetic mean of only the first and last points is taken. FIG. 8 depicts this process graphically.

In FIG. 8, a number of data points 800 are recorded. The convex hull of these points 802 has been determined. All that remains after convex hull 802 is determined is to determine which of the line segments forming the edge of convex hull 802 will be extrapolated to form the optimal affine function. FIG. 8 shows how this is done using both objective functions. For the first objective function, the arithmetic mean of all of the measurement times is taken (i.e., the mean of 3, 4, 5, 7, and 9). That value is 5.6. Line 804 is the line t=5.6. Line 804 crosses line segment 808, which is the line segment formed by points (4,4) and (7,8) on the convex hull. Therefore line segment 808 should be extrapolated to achieve the optimal affine function 810.

Likewise, to use the second objective function, on takes the arithmetic mean of the first and last measurement times (here 3 and 9). This gives us a value of 6. Line 806 is the line t=6. Note that line 806 crosses line segment 808. Thus, line segment 808 should be extrapolated to form the optimal affine function.

The extrapolation is performed using the familiar "point-slope" formula. Given a line segment containing two points $(x_1, y_1)$ and $(x_2, y_2)$, the formula for the function yielding a line containing the two points is $$y = \left(\frac{y_2 - y_1}{x_2 - x_1}\right)x - \left(\frac{y_2 - y_1}{x_2 - x_1}\right)x_1 + y_1.$$

Figure 9:
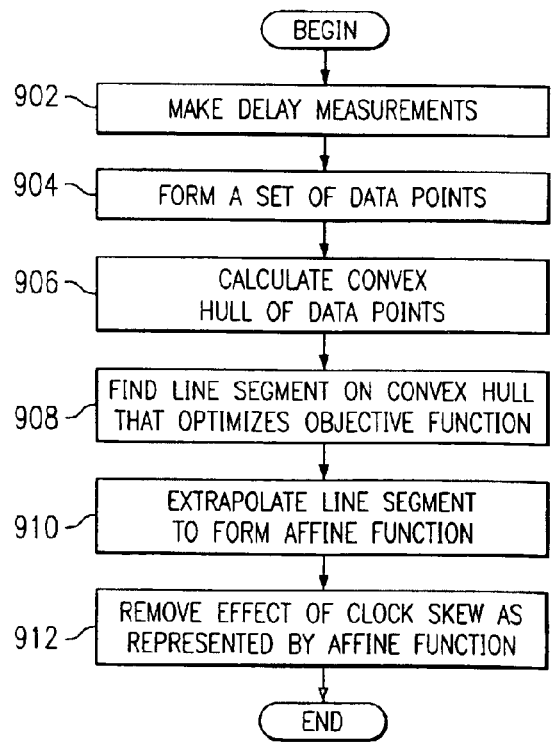
FIG. 9 is a flowchart representation of a process estimating clock skew between two network-attached data processing systems in accordance with a preferred embodiment of the present invention.

FIG. 9 is a flowchart representation of a process of removing the effect of clock skew between two networked data processing systems in accordance with a preferred embodiment of the present invention. First, delay measurements are taken (step 902) and a set of data points are formed from the delay measurements (step 904). Then, the convex hull of the set of data points plotting measured delays against measurement times is taken (step 906). Next, a line segment on the convex hull that, when extrapolated, optimizes some objective function is selected (step 908) and the line segment is extrapolated to form an affine function (step 910). Thereafter, the effect of clock skew, as represented by the affine function, is removed (step 912) and the process ends.

One of ordinary skill in the art will recognize that the processes described herein are applicable not only to the problem of estimating clock skew in end-to-end network measurements, but may also be applied to any problem in which an affine function providing a tight lower bound on a set of points is desired. The process of the present invention determines clock skew so that delay measurements with respect to clock skew are positive. Furthermore, the process of the present invention may be performed quickly, so that the process may be adapted to new measurements and recalculated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for removing the effect of clock skew between data processing systems, comprising:

making delay measurements between two data processing systems connected by a network;

forming a set of data points, wherein each data point in the set of data points comprises a time and a delay measurement for the respective time;

finding a convex hull of the set of data points, wherein the convex hull is bounded by a number of line segments;

selecting a one of the line segments that optimizes an objective function;

extrapolating the one of the line segments to obtain an affine function; and removing the effect of clock skew between the two data processing systems as characterized by the affine function, wherein the one of the line segments is selected so that the sum of the vertical distances between each of the set of data points and a line containing the one of the line segments will be minimized, and further wherein selecting the one of the line segments includes:

calculating an arithmetic mean of x-coordinate of all of the set of data points; and selecting a one of the line segments that contains a point whose x-coordinate is equal to the arithmetic mean.

2. A method for removing the effect of clock skew between data processing systems, comprising:

making delay measurements between two data processing systems connected by a network;

forming a set of data points, wherein each data point in the set of data points comprises a time and a delay measurement for the respective time;

finding a convex hull of the set of data points, wherein the convex hull is bounded by a number of line segments;

selecting a one of the line segments that optimizes an objective function;

extrapolating the one of the line segments to obtain an affine function; and removing the effect of clock skew between the two data processing systems as characterize by the affine function, wherein the one of the line segments is selected so that the area between a plot of a piecewise-linear function containing the set of data points and a line containing the one of the line segments will be minimized, and further wherein selecting the one of the line segments includes:

calculating an arithmetic mean of an x-coordinate of a first data point and an x-coordinate of a second data point, wherein the x-coordinate of the first data point is the lowest of any data point in the set of data points, and wherein the x-coordinate of the second data point is the greatest of any data point in the set of data points; and selecting a one of the line segments that contains a point whose x-coordinate is equal to the arithmetic mean.

3. The method of claim 1, wherein the x-coordinate of each data point in the set of data points represents a time measurement.

4. The method of claim 1, wherein the y-coordinate of each data point in the set of data points represents a delay measurement.

5. The method of claim 4, wherein the delay measurement is a communication delay between two data processing systems connected by a network.

6. A computer program product, in a computer-readable medium, for removing the effect of clock skew between data processing systems, comprising instructions for:

making a delay measurement between two data processing systems connected by a network;

forming a set of data points, wherein each data point in the set of data points comprises a time and a delay measurement for the respective time;

finding a convex hull of the set of data points, wherein the convex hull is bounded by a number of line segments;

selecting a one of the line segments that optimizes an objective function;

extrapolating the one of the line segments to obtain an affine function; and removing the effect of clock skew between the two data processing systems as characterized by the affine function, wherein the one of the line segments is selected so that the sum of the vertical distances between each of the set of data points and a line containing the one of the line segments will be minimized, and further wherein the instructions for selecting the one of the line segments include instructions for:

calculating an arithmetic mean of x-coordinates of all of the set of data points; and selecting a one of the line segments that contains a point whose x-coordinate is equal to the arithmetic mean.

7. A computer program product, in a computer-readable medium, for removing the effect of clock skew between data processing systems, comprising instructions for:

making a delay measurement between two data processing systems connected by a network;

forming a set of data points, wherein each data point in the set of data points comprises a time and a delay measurement for the respective time;

finding a convex hull of the set of data points, wherein the convex hull is bounded by a number of line segments;

selecting a one of the line segments that optimizes an objective function;

extrapolating the one of the line segments to obtain an affine function; and removing the effect of clock skew between the two data processing systems as characterized by the affine function, wherein the one of the line segments is selected so that the area between a plot of a piecewise-linear function containing the set of data points and a line containing the one of the line segments will be minimized, and further wherein the instructions for selecting the one of the line segments include instructions for:

calculating an arithmetic mean of an x-coordinate of a first data point and an x-coordinate of a second data point, wherein the x-coordinate of the first data point is the lowest of any data point in the set of data points, and wherein the x-coordinate of the second data point is the greatest of any data point in the set of data points; and selecting a one of the line segments that contains a point whose x-coordinate is equal to the arithmetic mean.

8. The computer program product of claim 6, wherein the x-coordinate of each data point in the set of data points represents a time measurement.

9. The computer program product of claim 6, wherein the y-coordinate of each data point in the set of data points represents a delay measurement.

10. The computer program product of claim 9, wherein the delay measurement is a communication delay between two data processing systems connected by a network.

11. A data processing system for removing the effect of clock skew between data processing systems, comprising:

a bus system a processing unit connected to the bus system, wherein the processing unit contains at least one processor;

a memory connected to the bus system; and a set of instructions, wherein the processing unit executes the set of instructions to perform the acts of:

making a delay measurement between two data processing systems connected by a network;

forming a set of data points, wherein each data point in the set of data points comprises a time and a delay measurement for the respective time;

finding a convex hull of the set of data points, wherein the convex hull is bounded by a number of line segments;

selecting a one of the line segments that optimizes an objective function; and extrapolating the one of the line segments to obtain an affine function; and removing the effect of clock skew between the two data processing systems as characterized by the affine function, wherein the one of the line segments is selected so that the sum of the vertical distances between each of the set of data points and a line containing one of the line segments will be minimized, and further wherein the act of selecting the one of the line segments includes:

calculating an arithmetic mean of x-coordinates of all of the set of data points; and selecting a one of the line segments that contains a point whose x-coordinate is equal to the arithmetic mean.

12. A data processing system for removing the effect of clock skew between data processing systems, comprising:

a bus system;

a processing unit connected to the bus system, wherein the processing unit contains at least one processor;

a memory connected to the bus system; and a set of instructions, wherein the processing unit executes the set of instructions to perform the acts of:

making a delay measurement between two data processing systems connected by a network;

forming a set of data points, wherein each data point in the set of data points comprises a time and a delay measurement for the respective time;

finding a convex hull of the set of data points, wherein the convex hull is bounded by a number of line segments;

selecting a one of the line segments that optimizes an objective function; and extrapolating the one of the line segments to obtain an affine function; and removing the effect of clock skew between the two data processing systems as characterized by the affine function, wherein the one of the line segments is selected so that the area between a plot of a piecewise-linear function containing the set of data points and a line containing the one of the line segments will be minimized, and further wherein the act of selecting the one of the line segments includes:

calculating an arithmetic mean of an x-coordinate of a first data point and an x-coordinate of a second data point, wherein the x-coordinate of the first data point is the lowest of any data point in the set of data points, and wherein the x-coordinate of the second data point is the greatest of any data point in the set of data points; and selecting a one of the line segments that contains a point whose x-coordinate is equal to the arithmetic mean.

13. The data processing system of claim 11, wherein the x-coordinate of each data point in the set of data points represents a time measurement.

14. The data processing system of claim 11, wherein the y-coordinate of each data point in the set of data points represents a delay measurement.

15. The data processing system of claim 14, wherein the delay measurement is a communication delay between two data processing systems connected by a network.

* * * * *

UNITED STATES PATENT AND TRADEMARK OFFICE
CERTIFICATE OF CORRECTION

PATENT NO. : 6,957,357 B2 Page 1 of 1
APPLICATION NO. : 09/920138
DATED : October 18, 2005
INVENTOR(S) : Liu et al.

It is certified that error appears in the above-identified patent and that said Letters Patent is hereby corrected as shown below:

Col. 7, line 40: delete " $f(a)=min/\beta c_1-c_2a-c_3\beta,$ " and insert

-- $f(\alpha)=\min_a c_1 - c_2\alpha - c_3\beta,$ --

Col. 10, line 9: after "mean" delete "x-coordinate" and insert --x-coordinates--.

Col. 10, line 27: after "systems as" delete "characterize" and insert --characterized--.

Col. 12, line 12: after "containing" insert --the--.

Signed and Sealed this

Twenty-sixth Day of December, 2006

JON W. DUDAS
*Director of the United States Patent and Trademark Office*